United States Patent
Hartung et al.

(10) Patent No.: US 11,532,070 B2
(45) Date of Patent: Dec. 20, 2022

(54) ORBITTING SATELLITES WITH AUTOMATED ACCURACY FOR ORTHORECTIFIED MOSAICS

(71) Applicant: Maxar Intelligence Inc., Westminster, CO (US)

(72) Inventors: Steven F. Hartung, Boulder, CO (US); Wolfgang Schickler, Golden, CO (US); Nathan Swanson, Erie, CO (US); Laurence C. Bleiler, Denver, CO (US)

(73) Assignee: Maxar Intelligence Inc., Westminster, CO (US)

( * ) Notice: Subject to any disclaimer, the term of this patent is extended or adjusted under 35 U.S.C. 154(b) by 33 days.

(21) Appl. No.: 17/165,708

(22) Filed: Feb. 2, 2021

(65) Prior Publication Data

US 2022/0245759 A1     Aug. 4, 2022

(51) Int. Cl.
*G06T 3/40* (2006.01)
*G06T 7/33* (2017.01)

(52) U.S. Cl.
CPC ............ *G06T 3/4038* (2013.01); *G06T 7/344* (2017.01); *G06T 2207/10032* (2013.01); *G06T 2207/30181* (2013.01)

(58) Field of Classification Search
CPC .................. G06T 3/4038; G06T 7/344; G06T 2207/10032; G06T 2207/30181
See application file for complete search history.

(56) References Cited

U.S. PATENT DOCUMENTS

| | | |
|---|---|---|
| 6,125,329 A | 9/2000 | Place |
| 6,928,194 B2 | 8/2005 | Mai |
| 7,925,114 B2 | 4/2011 | Mai |
| 8,121,433 B2 | 2/2012 | Leprince |
| 8,768,104 B2 | 7/2014 | Moses |

(Continued)

OTHER PUBLICATIONS

Lourakis, et al., "SBA: A Software Package for Generic Sparse Bundle Adjustment," ACM Transactions on Mathematical Software, Mar. 2009 Article No. 2 available at: https://doi.org/10.1145/1486525.1486527.

(Continued)

*Primary Examiner* — Chan S Park
*Assistant Examiner* — Daniel C Chang
(74) *Attorney, Agent, or Firm* — Vierra Magen Marcus LLP

(57) ABSTRACT

A set of input images from satellites (or other remote sensors) can be orthorectified and stitched together to create a mosaic. If the resulting mosaic is not of suitable quality, the input images can be adjusted and the processes of orthorectifying and creating the mosaic can be repeated. However, orthorectifying and creating the mosaic uses a large amount of computational resources and takes a lot of time. Therefore, performing numerous iterations is expensive and sometimes not practical. To overcome these issues, it is proposed to generate an indication of accuracy of the resulting mosaic prior to orthorectifying and creating the mosaic by accessing a set of points in the plurality of input images, projecting the points to a model, determining residuals for the projected points, and generating the indication of accuracy of the orthorectified mosaic based on the determined residuals.

15 Claims, 12 Drawing Sheets

(56) References Cited

U.S. PATENT DOCUMENTS

| | | | |
|---|---|---|---|
| 9,251,419 B2 | 2/2016 | Johnston | |
| 9,875,404 B2 | 1/2018 | Johnston | |
| 2005/0031197 A1* | 2/2005 | Knopp | G01C 11/06 |
| | | | 382/154 |
| 2008/0080737 A1* | 4/2008 | Rhoads | G06F 16/29 |
| | | | 382/100 |

OTHER PUBLICATIONS

Triggs, et al., "Bundle Adjustment—A Modern Synthesis," ICCV '99 Proceedings of the International Workshop on Vision Algorithms: Theory and Practice, Jan. 2000 available at: https://hal.inria.fr/inria-00548290.

* cited by examiner

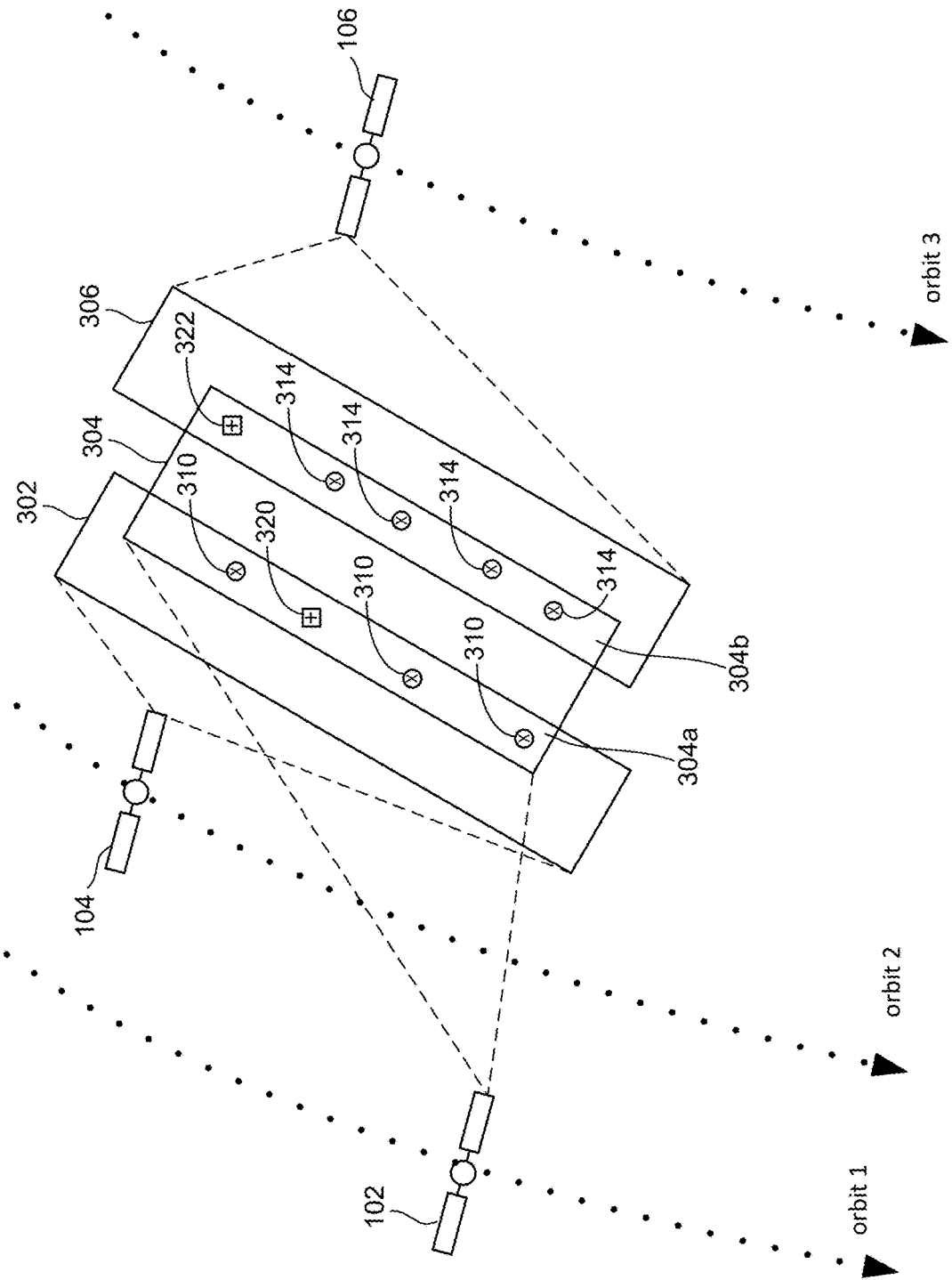

ORBITTING SATELLITES WITH AUTOMATED ACCURACY FOR ORTHORECTIFIED MOSAICS

BACKGROUND

The use of satellite-based and aerial-based imagery is popular among government and commercial entities. To such entities, it can be useful to piece together thousands of separate images (referred to herein as input images) taken from satellites (or other remote sensors) into an orthorectified mosaic. For purposes of this document, a mosaic is a composite image created by arranging together a plurality of smaller images (the input images). For purposes of this document, orthorectification is the process of removing the effects of image perspective (tilt) and relief (terrain) for the purpose of creating a planimetrically correct image. The resultant orthorectified images often have a constant scale wherein features are represented in their "true" positions. This allows for the accurate direct measurement of distances, angles, and areas. Orthorectified images are commonly used as in visualization tools such as, for example, Google Earth.

Because it is not a routine matter to align and orient separate images relative to each other to produce an orthorectified mosaic, misalignment errors are common. While co-alignment can be performed, the process is rarely perfect. Misalignment errors can result in a straight road or edge of a building appearing in the orthorectified mosaic as a road or building edge with a inflection point at the seam between images or in which the road segments in the two different images on either side of the seam do not intersect (see e.g., misaligned roads, parking lots, and buildings in the example orthorectified mosaic of FIG. 1). If the resulting orthorectified mosaic is not of suitable quality (e.g., due to misalignment), the set of input images can be adjusted (e.g., add or remove input images from the set of input images) and the processes of orthorectifying and creating the mosaic can be repeated. However, the processes of orthorectifying and creating the mosaic use a large amount of computational resources and take a lot of time. Therefore, performing numerous iterations of orthorectifying and creating the mosaic is expensive and sometimes not practical.

BRIEF DESCRIPTION OF THE DRAWINGS

FIG. 4 depicts input images with tie points and ground control points.

DETAILED DESCRIPTION

In order to provide for the generation of an orthorectified mosaic of suitable quality (e.g., no misalignment or reduced misalignment) without performing unnecessary iterations of orthorectifying and creating the mosaic (which uses a large amount of computational resources and takes a lot of time), it is proposed to generate an indication of accuracy of the resulting mosaic prior to the processes of orthorectifying and creating the mosaic. In one embodiment, this indication of accuracy of the resulting mosaic is generated by accessing a set of points in the plurality of input images, projecting the points to a model, determining residuals for the projected points, and generating the indication of accuracy of the orthorectified mosaic for the plurality of input images based on the determined residuals. With this new technology, the quality of the resulting mosaic can be confirmed prior to the processes of orthorectifying and creating the mosaic, which will save compute resources and time.

Many overlapping layers of imagery may be part of the material selection for a mosaic, but the mosaic is typically only one layer in the final product. In one embodiment, the technology described herein can be used to determine which image layers should be used for the most geospatially accurate mosaic.

Figure 2:
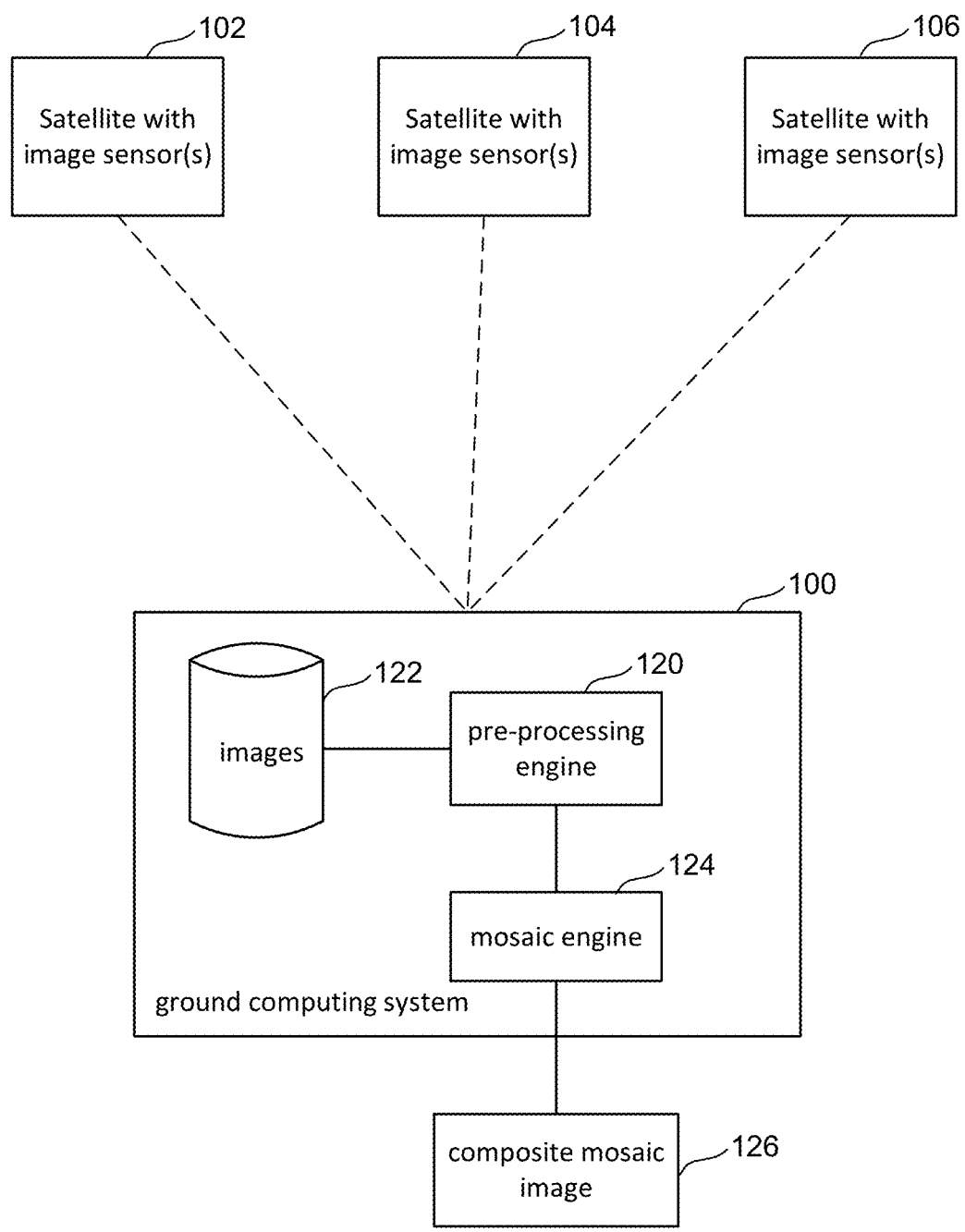
FIG. 2 is a block diagram of one example set of components that can implement the technology described herein.

FIG. 2 is a block diagram of one example set of components that can implement the technology described herein. FIG. 2 shows a ground computing system 100 in wireless communication (e.g., RF or optical communication) with satellites 102, 104, and 106. Each of the satellites includes one or more image sensors. For example, each of the satellites can include push-broom or frame-type cameras for capturing images in the visual spectrum. Alternatively, these satellites can be used with image sensors to capture other electromagnetic bands such as SWIR, IR, SAR, multi-spectral or hypo-spectral images. The satellites may be in various types of orbit including geostationary orbit, non-geostationary orbit, as well as other orbits. No particular structure for a satellite and no particular orbit is required. Although FIG. 2 shows three satellites, more or less since three satellites can be used.

Figure 1:
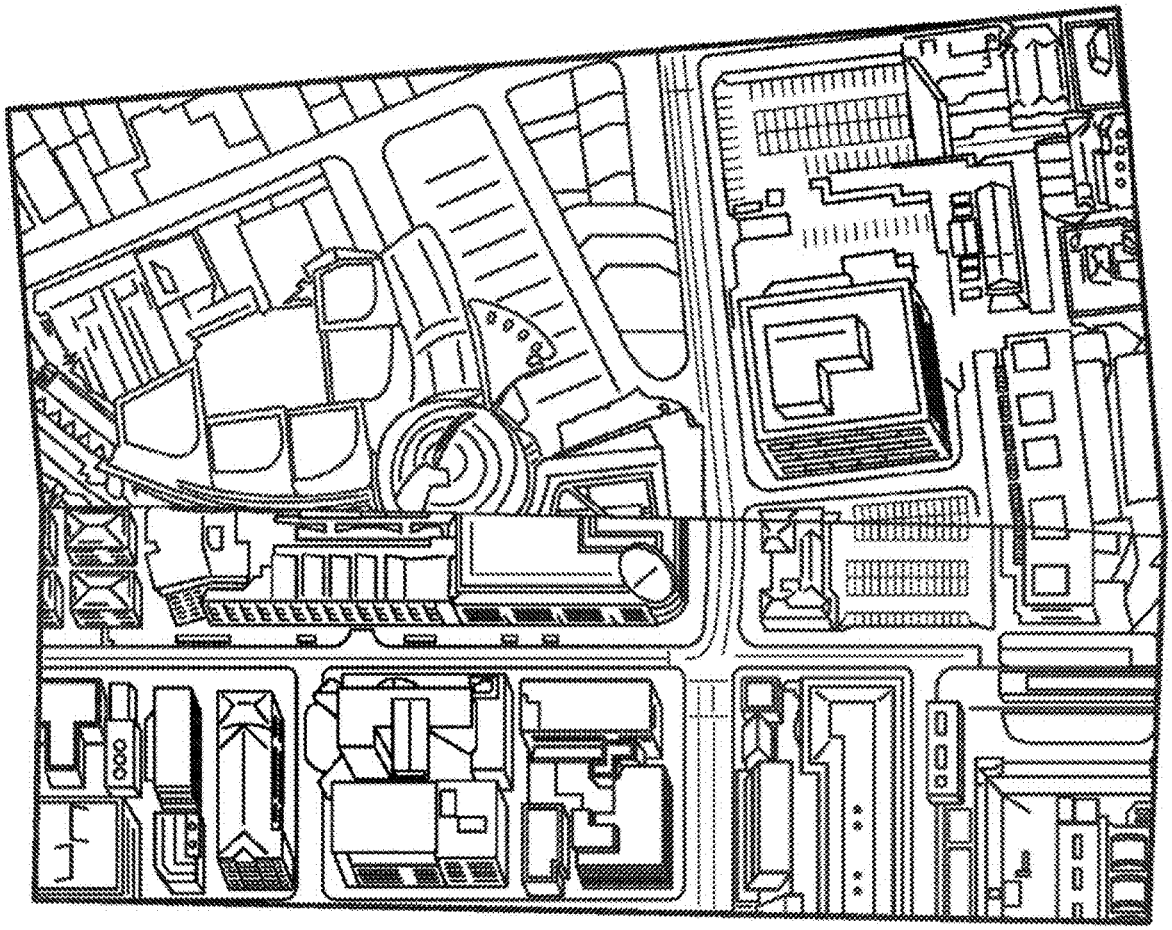
FIG. 1 depicts a portion of an orthorectified mosaic.

Ground computing system 100 may include one or more computers acting together to perform the processes described below. In one embodiment, ground computing system 100 includes one or more processors for performing the methods described below and one or more non-transitory processor readable storage mediums that collectively store processor readable code that, when executed by the one or more processors, causes the one or more processors to perform the methods described below. Examples of non-transitory processor readable storage mediums include hard disk drives, flash memory, MRAM, other solid-state memory, RAM, ROM, etc. FIG. 2 shows ground computing system 100 including a pre-processing engine 120 in communication with an image store 122 and a mosaic engine 124. In one embodiment, pre-processing engine 120 and mosaic engine 124 are software modules running on one or more processors. In another embodiment, pre-processing engine 120 and mosaic engine 124 are separate standalone electric circuits or separate processors programmed to operate as described below. In one embodiment, image store 122 is a data structure for storing the set of images received from satellites 102, 104, and 106. Any type of database or data structure can be used. Thus, satellites 102, 104, and 106 are used to capture images, those images are transmitted wirelessly to ground computing system 100 for storage in image store 122, and then the images are processed by pre-processing engine 120 and mosaic engine 124. In one embodiment, mosaic engine 124 creates the orthorectified mosaic images. Pre-processing engine 120 performs various pre-processing tasks, prior to submission of the images to the mosaic engine 124, as described below. The output of pre-processing engine 120 is a set of preprocessed images (as described below) and that output is provided to mosaic engine 124 which uses that output to produce the mosaic. The output of mosaic engine 124 is the composite mosaic image 126 (see e.g., FIG. 1). More detail of the operation of the components of FIG. 2 are described below.

Figure 3:
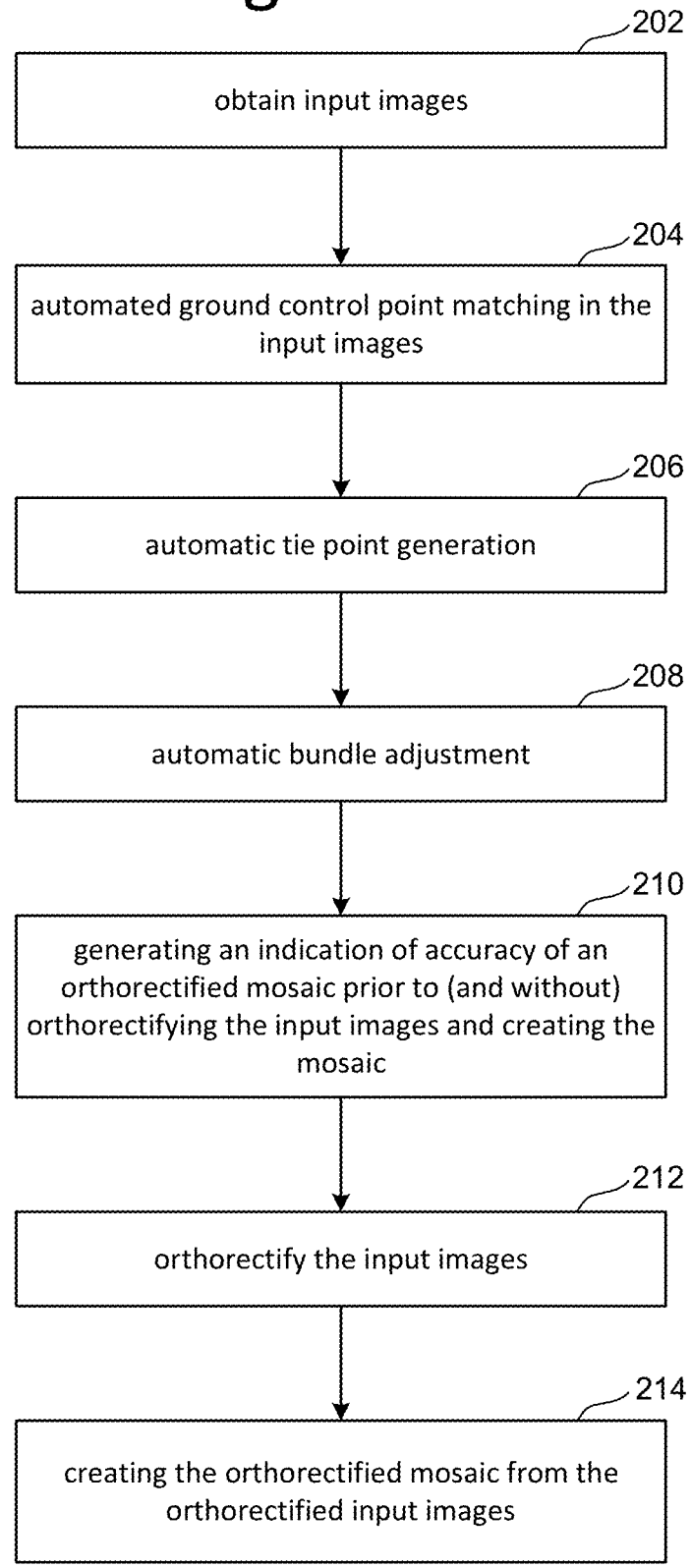
FIG. 3 is a flow chart describing one embodiment of a process for creating an orthorectified mosaic.

FIG. 3 is a flowchart describing one embodiment of a process for creating an orthorectified mosaic. The process of FIG. 3 is performed by components depicted in FIG. 2. In step 202 of FIG. 3, the system obtains input images. For example, satellites 102, 104, and 106 send to ground computing system 100 various images of portions of the earth's surface or elsewhere. The input images obtained in step 202 include overlapping input images that are from a plurality of sensors at different perspectives. For example, multiple satellites can obtain images that depict at least a common portion of the earth's surface such that the images are overlapping. However, because these satellites are in different orbits, the perspective of the satellites will be different. In one embodiment, each of the images include metadata. Examples of metadata include attitude of the satellite (or attitude of the sensor on the satellite) and/or ephemeris data for the satellite (and/or ephemeris data for the sensor). In one example embodiment, ephemeris data includes location of the satellite and time of taking the data for the location. In some embodiments, the image sensors can be on different vehicles or structure other than satellites.

In step 204 of FIG. 3, the system performs automated ground control point matching in the input images. Ground control points (GCPs) are places on the earth's surface that have been precisely surveyed in order to determine the exact longitude and latitude of those locations. Those locations are easy to spot in images. Step 204 includes finding those locations (the ground control points) in various images. In one embodiment, the ground control points can be stored in a library. Those points that overlap in the imagery can then be matched into the imagery using any number of correlation mechanisms including (but not limited to) normalized cross correlation, feature matching, mutual information, and/or least-square matcher. The resulting matching point coordinates in image space will be projected to ortho-projection space via a camera model, as discussed below.

In step 206, the system performs automatic tie point generation. A tie point (TP) is a specific location that is recognizable in the overlap area between two or more images. The image positions of tie points in the overlap areas can be identified and measured manually or automatically. Automatic tie point generation can be performed using normalized cross correlation, feature matching, mutual information or least squares matching. The resulting tie point matching point coordinates in image space will later be projected ortho-projection space via a camera model, as discussed below.

FIG. 4 provides an example of steps 202-206. FIG. 4 show satellites 102, 104, and 106 in separate orbits. Satellite 102 is in orbit 1, satellite 104 is in orbit 2, and satellite 106 is in orbit 3. Each of the satellites includes a sensor for taking a digital photograph of a same area on the earth's surface. Satellite 102 has captured image 304, satellite 104 has captured image 302, and satellite 106 has captured image 306. Images 302, 304, and 306 are overlapping images in that the content depicted in three images overlap. For example, overlap area 304a depicts the overlap of image 302 and 304, and overlap area 304b depicts the region of overlap between images 304 and 306. Images 302, 304, and 306 were captured by satellites 102, 104, and 106 and sent to ground computing system 100 as part of step 202. Image overlap area 304a includes a series of tie points 310 and a ground control point 320. Thus, tie points 310 and ground control point 320 are in both images 302 and 304. Image overlap area 304b includes ground control point 322 and tie points 314. Thus, tie points 314 and ground control point 322 are in both images 304 and 306. Ground control points 320 and 322 were identified in step 204 of FIG. 3. Tie points 310 and 314 were identified in step 206 of FIG. 3. Although FIG. 4 shows seven tie points and two ground control points, it is contemplated that in other embodiments, more or less that number of ground control points and tie points will be included. In many embodiments, overlap regions and images will include many tie points and many ground control points. In some embodiments, the system will only generate tie points and will not use any ground control points. In other embodiments, the system will use ground control points and not use any tie points. While tie points must be in two or more images, ground control points can be in one or more images. More information about tie points, automatic tie point generation and ground control points can be found in U.S. Pat. Nos. 9,251,419 and 9,875,404, both of which are incorporated by reference herein in their entirety.

Looking back and FIG. 3, in step 208, the system performs automatic bundle adjustment. Bundle adjustment is the process of refining a visual reconstruction to produce jointly optimal 3D structure in viewing parameter estimates. Optimal means that the parameter estimates are found by minimizing some cost function that quantifies the model fitting the error, and jointly that the solution is simultaneously optimal with respect to both structure and camera variations. The name refers to the 'bundles' of light arrays leaving each 3D feature and converging on each camera center which are adjusted optimally with respect to both feature and camera positions. Equivalently, unlike independent model methods, which merge partial constructions without updating the internal structure, in one embodiment all of the structure and camera primers are adjusted together in one bundle.

Bundle adjustment can be thought of as large sparse geometric parameter estimation problem, the parameters being the combined 3D feature coordinates, camera poses and calibrations. Almost everything can be applied to many similar estimation problems in vision, photogrammetry, industrial metrology, surveying and geodesy. Adjustment computations are a major common theme throughout measurement sciences and once their basic theories and methods are understood, they are easy to adapt to a wide variety of problems. Adaptation is largely a matter of choosing a numeric optimization scheme that exploits the problem structure and sparsity.

Classically, bundle adjustment computations are formulated as non-linear least-squares problems. The cost function is assumed to be quadratic in the feature reprojection errors, and robustness is provided by explicit outlier screening. Modern systems also use non-quadric M-estimator-like distributional models to handle outliers more integrally, and many include additional penalties related to overfitting, model selection and system performance (priors, MDL). For this reason, in some embodiments, it will not be assumed to use a least-squares/quadratic cost model. Instead, the cost can be modeled as a sum of opaque contributions from the independent information sources (individual observations, prior distributions, overfitting penalties, . . . ). The functional forms of these contributions and their dependence on fixed quantities such as observations will usually be left implicit. This allows many different types of robust and non-robust cost contributions to be incorporated, without unduly cluttering the notation or hiding essential model structure. It fits well with modern sparse optimization methods (cost contributions are usually sparse functions of the parameters) and object-centered software organization, and avoids many tedious displays of chain-rule results. Implementations are assumed to be capable of choosing appropriate functions and calculating derivatives themselves.

Bundle adjustment is known in the art. Many different types and functions for implementing bundle adjustment can be used with the present technology. Examples of methodology for bundle adjustment can be found in the following papers: Lourakis, M. I. A. and Argyros, A. A. 2009. SBA: A Software Package For Generic Sparse Bundle Adjustment, ACM Trans. Math. Softw. 36, 1, Article 2, March 2009, 30 pages, DOI=10.1145/1486525.148527; and Triggs, McLauchlan, Hartley, and Fitzgibbon, Bundle Adjustment A Modern Synthesis, International Workshop on Vision Algorithms, September 2000, Corfu, Greece, pp. 298-372, 10.1007/3-540-44480-7_21.inria-00548290, both of which were incorporated by reference herein in their entirety.

Figure 5A:
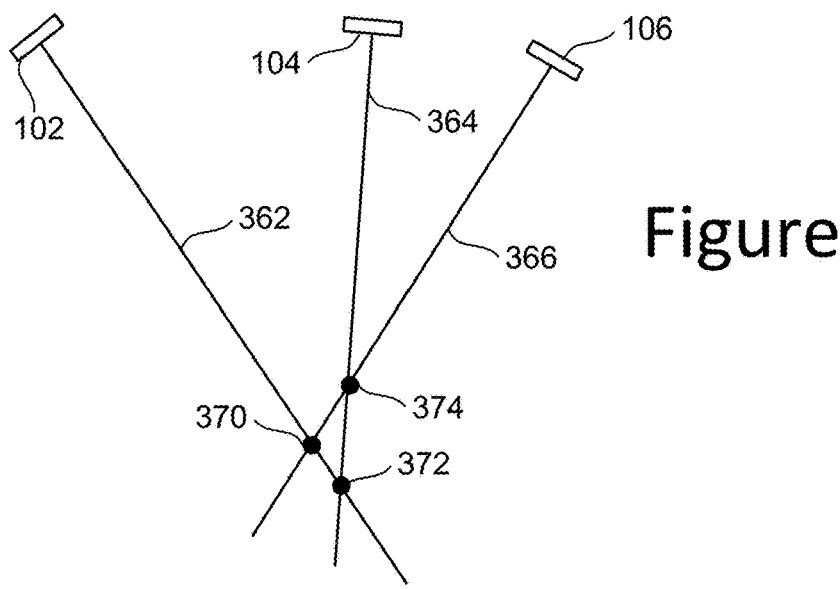
FIGS. 5A and 5B depicts projecting rays from image sensors.
Figure 5B:
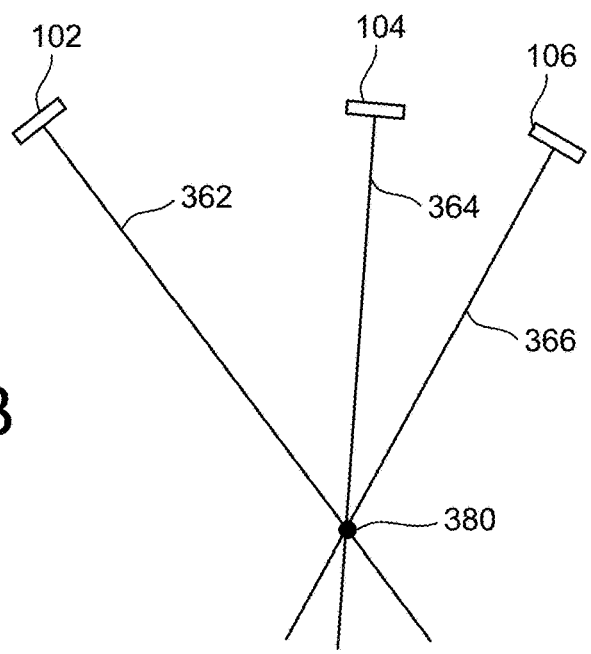

As discussed above, in one embodiment, each of the images captured by the satellites will include metadata. One example of the metadata is attitude of the satellite (e.g., where the satellite is pointing) and ephemeris data. In one example embodiment, the automatic bundle adjustment includes adjusting the attitude data and the ephemeris data to reduce errors. In another embodiment, the bundle adjustment includes only adjusting the attitude data. In another embodiment, the bundle adjustment includes only adjusting the ephemeris data. In another embodiment, the bundle adjustment includes adjusting other metadata to reduce error. The reduction of error, the goal of the bundle adjustment, is explained better with respect to FIGS. 5A and 5B. FIG. 5A shows satellites 102, 104 and 106 as image planes (as each includes an image sensor). A ray is depicted extending from each of the image planes for a common tie point in all three of the image planes. For example, ray 362 extends from satellite 102, ray 364 extends from satellite 104, and ray 366 extends from satellite 106. The rays may not intersect at all in 3-D space, a difficult thing to represent in drawings. But they will pass within some minimal distance of the idealized intersection (such as the one shown in FIG. 5B). However, for example purposes, FIG. 5A shows that these rays intersect: ray 362 intersects ray 364 at point 372, ray 362 intersects ray 366 at point 370, and ray 364 intersects ray 366 at point 374. All three rays are projections from the same tie point. If there was no error, then intersection point 370, 372, and 374 should be the same exact point. The fact that the three intersection points are separated is the error. Bundle adjustment seeks to reduce or eliminate this error. In an ideal embodiment, bundle adjustment will eliminate the error; however, in real life there will be many errors for many different tie points so bundle adjustment will do its best to minimize the error across all the tie points. FIG. 5B shows an example when bundle adjustment has removed the error. As can be seen, all three rays 362, 364, and 366 now intersect at a single common intersection point 380. Therefore; there is no error. This error was reduced by adjusting the metadata, for example, adjusting the attitude data for one, two, or all three of the satellites 102, 104, 106 and/or adjusting the ephemeris data for one, two, or three of the satellites. Even though image-to-ground is done both in this proposed process and also in generating the mosaic pixels, the sub-pixel tie point coordinates are (sometimes) not preserved in the latter since the projections are on a fixed pixel grid spacing. Thus, one cannot simply derive or reverse-engineer the sub-pixel ground locations of this result out of the typical processes involved with creating an ortho-mosaic. Any remeasurement of the position will induce measurement error. The projections for error analysis in this process are done entirely mathematically and (in one embodiment) do not involve the actual image pixels themselves. In one embodiment, the pixels are only used for the initial point x-y pixel location identification in the images. The bundle adjustment works in spatial resolution comparable to small fractions of a pixel. This level of precision is not recoverable from an orthomosaic pixel.

Figure 5C:
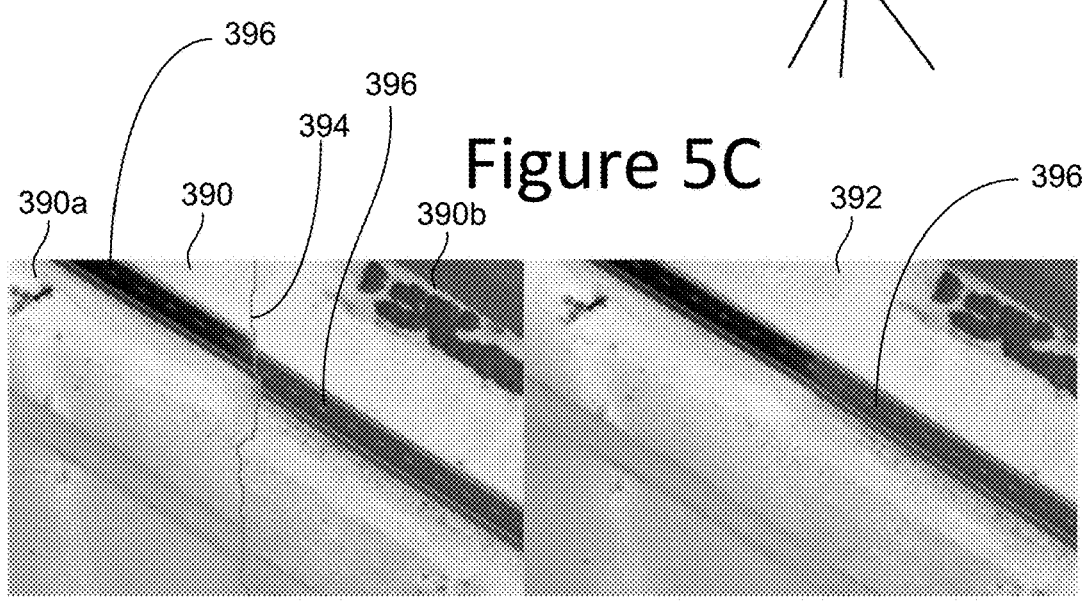
FIG. 5C depicts portions of two example orthorectified mosaics.

The effect of the bundle adjustment could also be described with respect to FIG. 5C, which shows two photographs 390 and 392. Photograph 390 is a portion of a mosaic where two images are stitched together, line 394 represents the seam between the two images. As can be seen, there is error in that images 390a and 390b do not line up perfectly along seam 394. For example, road 396 is depicted as misaligned at seam 394. The process of automatic bundle adjustment in step 208 of FIG. 3 seeks to adjust the metadata (e.g., attitude data or ephemeris data) in order to arrive at image 392 where the road 396 is no longer is depicted as misaligned at the seam. In fact, in image 392, the seam cannot be detected. This effect is the result of improved accuracy in the metadata and is not to be confused with warping or distorting the imagery to achieve a blended seamline.

In one embodiment, the system performs the automatic bundle adjustment by projecting tie points to a model and performing triangulation among the intersection points (e.g., 370, 372, and 374) to determine a best point of intersection (e.g., 380) in the ortho-projection space for the rays projected for the points from the overlapping images. This altering of the metadata reduces the error.

Looking back at FIG. 3, after the automatic bundle adjustment of step 208, the system generates an indication of accuracy of an orthorectified mosaic prior to (and without) orthorectifying the input images and/or creating the mosaic. That is, without performing the orthorectification and without creating the mosaic image from the orthorectified images, the system generates an indication of accuracy of the future mosaic. Step 210 is performed without generating the mosaic. Step 210 is performed without needing to generate the mosaic and without needing to rectify the input images. Thus, even if another computer is performing the orthorectification and creation of the mosaic on the side, it does not matter because the processor generating the indication of accuracy does not use that information. The advantage of generating the indication of accuracy prior to and without having to orthorectify the input images and without having to create the mosaic allows the system to save tremendous amount of computational resources and time. Before using those resources to create the mosaic, the system determines whether the mosaic will be of sufficient quality. If so, the system can proceed to create the mosaic. But if the mosaic is not going to be of sufficient quality, the input images can be adjusted or the process can be aborted so that computational resources and time are not wasted. More details of implementing step 210 are provided below. Although FIG. 3 shows that the indication of accuracy is generated after and based on the control points, the tie points, and the automatic bundle adjustment, in other embodiments, the indication of accuracy can be generated without performing automatic bundle adjustment and just use the unadjusted tie points and control points. In some embodiments, the indication of accuracy can be generated using tie points but not ground control points. In some embodiments, the indication of accuracy can be generated using ground control points but not tie points. Steps 202-210 are performed automatically (e.g., not manually and not by a human) by pre-processing engine 120 of ground computing system 100. In other embodiments, steps 202-208 can be performed by other computing systems.

If the indication of accuracy generated in step 210 shows that the future resulting mosaic would be of sufficient quality, then the system will proceed with creating that mosaic. That is, the control points and/or tie points (adjusted or unadjusted) are provided to mosaic engine 124. In step 212, mosaic engine 124 will orthorectify the input images to create orthorectified input images. The process of orthorectifying is well known in the art. In step 214, mosaic engine 124 will create the orthorectified mosaic from the orthorectified input images of step 212. Creating the orthorectified mosaic from the orthorectified input images is well known in the art. Note that more information about orthomosaics, tie points, and ground control points can be found in the following patents that are incorporated herein by reference in their entirety: U.S. Pat. Nos. 6,125,329; 6,928,194; 7,925,114; 8,121,433; and 8,768,104.

Figure 6:
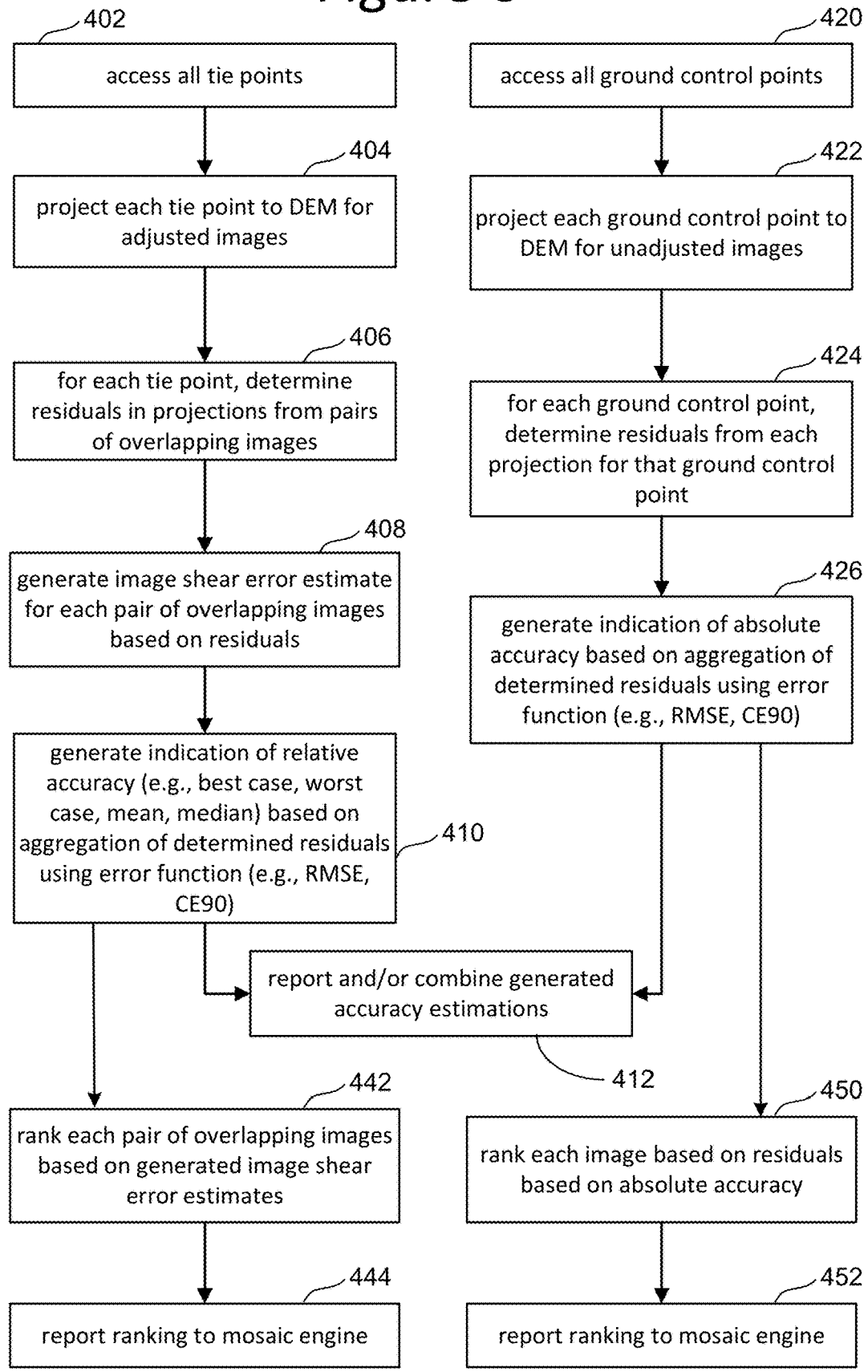
FIG. 6 is a flow chart describing one embodiment of a process for generating an indication of accuracy of an orthorectified mosaic prior to (and without) orthorectifying the input images and creating the mosaic.

FIG. 6 is a flowchart describing one embodiment of a process for generating an indication of accuracy for an orthorectified mosaic prior to (and without) orthorectifying the input image and creating the mosaic. That is, the process of FIG. 6 is one example implementation of step 210 of FIG. 3. In one embodiment, the process of FIG. 6 is performed by pre-processing engine 120 (see FIG. 2).

The process of FIG. 6 starts at step 402, including accessing all tie points for the plurality of overlapping input images that will be used to create the mosaic. In step 404, the system projects each ray for each tie point for the adjusted images to a model. The images are adjusted because they went through the automatic bundle adjustment in step 208. In one embodiment, the model is a digital elevation model ("DEM"). In example implementations, the DEM used may be a digital terrain model or a digital surface model. In one embodiment, projecting each tie point to the DEM includes projecting a ray from the image sensor to the DEM. This ray is projected in ortho-projection space. The ray projection can be performed from basic reconstructed imagery using rigorous camera models (e.g., full sensor model or community sensor model) or a rational polynomial coefficients model. More details of step 404 are provided below with respect to FIG. 7.

In step 406 of FIG. 6, the system, for each tie point, will determine the residuals in projections from pairs of overlapping images. As discussed above, rays projected from a tie point in a pair of overlapping images should intersect at a common intersection point (see discussion above). In an ideal world, that common intersection point will be on the DEM. But in a non-ideal world, the intersection point will be above or below the DEM. Therefore, the rays from each of the overlapping images for the same tie point will intersect the DEM at different locations on the DEM. Step 406 includes determining the residuals for each tie point. In one embodiment, the residual is the difference between the locations of where two projections for a same tie point (but from different images) intersect the DEM. In one embodiment, determining the residuals for the projected points comprise the determining relative distances along a plain in the ortho-projection space between intersection points for a common tie point. Thus, the residual is the difference in locations. More details of step 406 will be discussed below with respect to FIG. 8.

Figure 7:
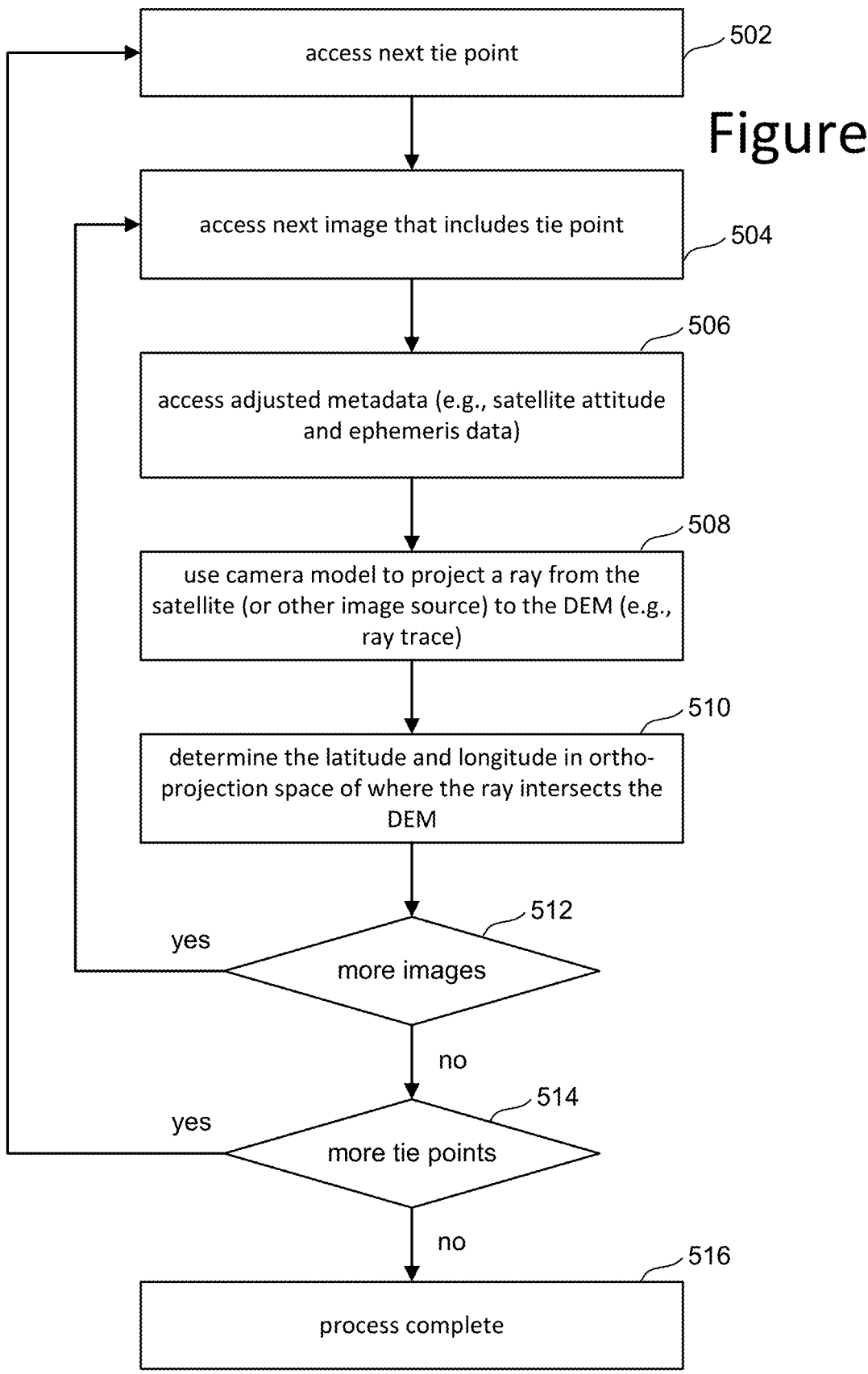
FIG. 7 is a flow chart describing one embodiment of a process for projecting tie points to a digital elevation model.

FIG. 7 is a flowchart describing one embodiment of projecting each tie point to the DEM for the adjusted overlapping images. That is the process of FIG. 7 is one example implementation of step 404 of FIG. 6. The process of FIG. 7, in one embodiment, is performed by pre-processing engine 120. In step 502 of FIG. 7, the system accesses the next tie point. If this is the first iteration of FIG. 7, then the first tie point is accessed from the entire population of tie points. In step 504, the system will access the next image that includes that tie point. As discussed, each tie point appears in overlapping images. One of those overlapping images is accessed in step 504. In step 506, the system accesses the adjusted metadata (e.g., satellite attitude and/or ephemeris data) for the image accessed in step 504. In step 508, the system uses a camera model to project a ray from the satellite (or other image source) to the DEM (e.g., a ray trace). This ray is projected in ortho-projection space from the pixel location of the tie point in the input image to the DEM. In step 510, the system determines the latitude and longitude in ortho-projection space of where the ray intersects the DEM. Note that the original image is in an image space that has a different coordinate system than the ortho-projection space. The coordinate system of the ortho-projection space is the space that the DEM is in. The camera model is used to translate between image space and ortho-projection space. Translating between coordinate systems is well known in the art. In one embodiment, a series of matrix transformations can be used to project the ray from the satellite to the DEM in ortho-projection space.

Figure 8:
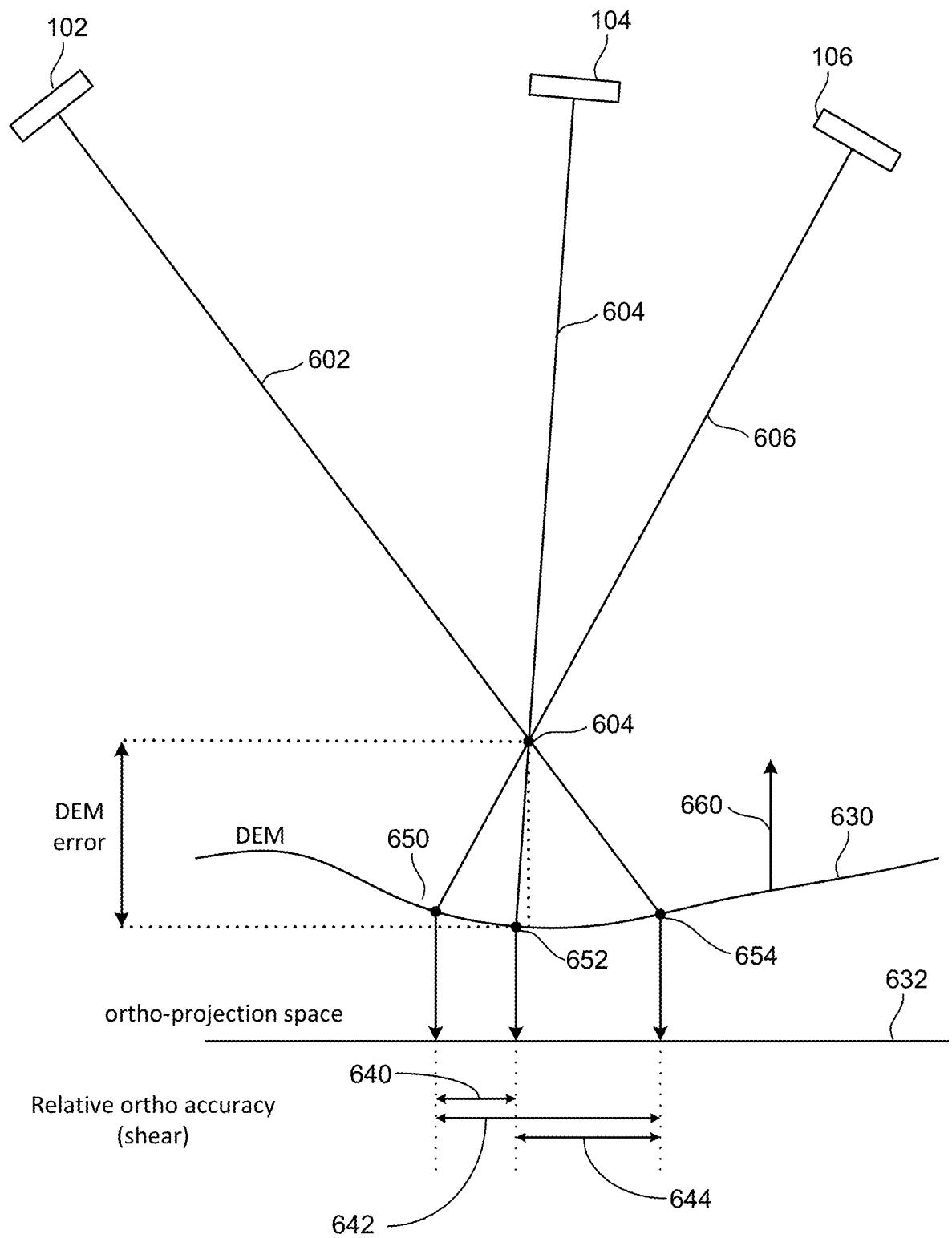
FIG. 8 illustrates one example of projecting tie points to a digital elevation model.

FIG. 8 illustrates one example of projecting tie points to a DEM. FIG. 8 shows satellites 102, 104, and 108. Rays are depicted that project from each of the satellites (or each of the images captured at the satellites) to the DEM for a common tie point. For example, ray 602 is projected from satellite 102, ray 604 is projected from satellite 104, and ray 606 is projected from satellite 106. Due to the bundle adjustment, all three rays (602, 604, 606) intersect at intersection point 604, which is depicted to be above DEM 630. The distance that intersection point 604 is above DEM 630 is referred to as the DEM error. FIG. 8 also shows where each of the rays 602, 604, 606 intersect DEM 630. For example, ray 606 intersects DEM 630 at intersection point 650, ray 604 intersects DEM 630 at intersection point 652, and ray 602 intersects DEM 630 at intersection point 654. Rays 602, 604, and 606 were generated in step 508 of FIG. 7. Intersection points 650, 652, and 654 are generated in step 510. For each of intersection points 650, 652 and 654, the system determines the latitude and longitude in ortho-projection space for those intersection points.

Step 406 of FIG. 6 includes determining residual between pairs of overlapping images. That is, determining the residuals between the intersection points (residual between the projection of the rays). In on embodiment, the residual is determined for the projected points by determining the relative distances along a plane (e.g., plane 632 in ortho-projection space) between intersection points for a common tie point. For example, FIG. 8 shows residual 640 between intersection points 650 and 652, residual 642 between intersection points 650 and 654, and residual 644 between intersection point 652 and 654 Thus, FIG. 8 shows that for accessed overlapping images that include a respective tie point, the system will project rays from the source of the input image to the DEM in ortho-projection space, determine latitude and longitude of the intersections points in ortho-projection space where the rays intersect the model and determine residuals for those intersection points (and for the rays) by determining relative distances along plane 632 (which is a plane in ortho-projection space).

Looking back at FIG. 7, after determining the latitude and longitude of where the rays intersect the DEM in step 510, the system determines whether there are more images that include the tie point being processed. If so, the process loops back to step 504 and accesses the next image and performs another iteration of steps 504-510. If there are no more images for this tie point, then in step 514 the system determines whether there are more tie points to consider and operate on. If so, then the process loops back to step 502 and performs another iteration of steps 502-512. If all the tie points have been processed, then the process of FIG. 7 is complete (step 516).

Looking back at FIG. 6, at the end of step 406, the system includes a set of difference numbers (residuals for each tie point) for all the tie points for the set of overlapping images that are being used to create a mosaic. In step 408, the system generates image shear error estimates for each pair of overlapping images based on the residuals of step 406. For example, for each pair of overlapping images the system aggregates all of the residuals for those two images for tie points that they have in common and creates an error estimate. In step 410 of FIG. 6, the system generates an indication of relative accuracy based on the aggregation of the determined residuals from steps 406 and 408. The indication of relative accuracy can be a best case number, worse case number, mean, median, or other metric. In one embodiment, the system aggregates all of the residuals using some type of error function. One example of error function is root mean square error (RMSE). Another example of the suitable error function is the U.S. Government's circular error to 90% (CE90). In one embodiment, all of the residual numbers are aggregated using the error function. In another embodiment, only the worst residual number for each tie point (e.g., for the worst pair of overlapping images) are aggregated using the error function. In another embodiment, the best case number for each tie point is aggregated using the error function. In another embodiment, the mean residual or the median residual for each tie point is used and aggregated using the error function. Various types of aggregation using various error functions can be performed. In step 412, the system will report the generated accuracy estimation from step 408.

At the same time that the system is performing steps 402-410, the system is concurrently performing steps 420-426. Alternatively, steps 420-426 can be performed after or before steps 402-410. In step 420 of FIG. 6, the system accesses all the ground control points. In step 422, the system projects each ground control point to the DEM for the unadjusted input images. This is, the input images that were not subjected to bundle adjustment or the images as they existed prior to bundle adjustment are sued in step 422.

In another embodiment, step 422 can project the ground control points for adjusted images. In one embodiment, the process (including the mathematics) for projecting a ground control point to the DEM is the same as for projecting a tie point to the DEM. In step 424, for each ground control point, the system determines the residuals from each of the projections for that ground control point. More details will be explained below.

Figure 9:
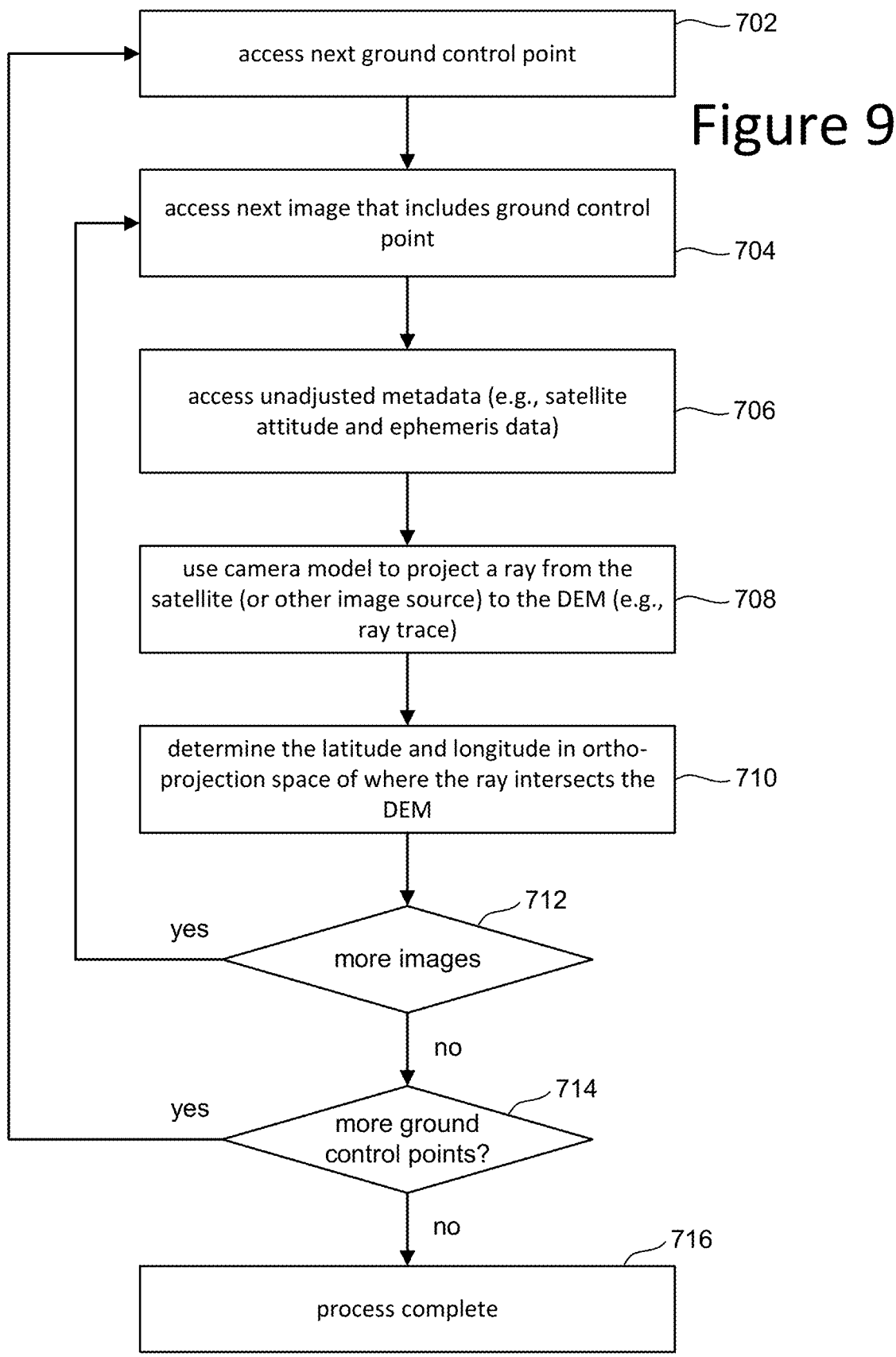
FIG. 9 is a flow chart describing one embodiment of a process for projecting ground control points to a digital elevation model.

FIG. 9 is a flowchart describing one embodiment of a process for projecting each ground control point to the DEM. That is, the process in FIG. 9 is one example implementation of step 422 of FIG. 6. In one embodiment, the process of FIG. 9 is performed by pre-processing engine 120. In step 702 of FIG. 9, the system accesses the next ground control point of the population of ground control points. In step 704, the system accesses the next image that includes that ground control point. In step 706, the accessed unadjusted metadata for that image will be accessed. If the process is operating on adjusted images, then the adjusted metadata will be accessed in step 706. In step 708, the system uses the camera model (see discussion above) to project a ray from the satellite (or other image source) to the DEM (e.g., a ray trace). In step 710, the system determines the latitude and longitude in ortho-projection space of the location where the ray intersects the DEM. Steps 708 and 710 are discussed in more detail with respect to FIG. 10, which shows satellites 102, 104, and 106, each of which has captured a separate image (overlapping images) that include the same ground control point (GCP). In step 708, the system projects a ray from each satellite to the DEM. For example, ray 760 is projected from satellite 102 to DEM 630, ray 762 is projected from satellite 104 to DEM 630, and ray 764 is projected from satellite 106 to DEM 630. The three rays 760, 762, and 764 intersect at intersection point 766. However, intersection point 766 is above DEM 630, representing the DEM error. Ray 760 intersects DEM 630 at intersection point 772, ray 762 intersects DEM 630 at intersection point 774, and ray 764 intersects DEM 630 at intersection point 776. Step 710 of FIG. 9 includes determining the latitude and longitude of intersection points 772, 774, and 776. Step 424 of FIG. 6 includes determining the residuals between the projected intersection points (772, 774, 776), and the actual ground control point GCP. This is indicated as a difference along plane 632 in ortho-projection space. For example, the residual between the projection of ray 764 and the ground control point is residual 780, the residual for projection of ray 762, and the ground control point GCP is residual 782, and the residual for the projection of ray 760 and ground control point GCP is residual 784. These residuals 780, 782, and 784 represent absolute residuals.

Looking back and FIG. 9, after step 710, the system determines whether there are more images to operate on that include control point currently being operated on. If so, the process loops back to step 704. If not, the process continues to step 714 and determines whether there are more ground control points to operate on. If so, the process moves back to step 702 and performs another iteration of step 702-712. If there are no more ground control points to operate on, then the process is complete (step 716).

Looking back at FIG. 6, after determining all the residuals in step 424, the system generates an indication of absolute accuracy based on the aggregation of determined residuals using an error function. Any of the error functions discussed above can be used and any of the means for aggregating can be used above. For example, all of the residuals can be combined using RMSC or CE90. Alternatively, only best case residuals for each GCP can be used, only worse residuals for each GCP can be used, the mean for each GCP can be used, median residual for each GCP can be used. After step 426 (and after step 410) in FIG. 6, the system reports the generated accuracy estimations in step 412. In one example, the relative accuracy from step 410 and the absolute accuracy from step 426 can be reported separately. In another embodiment, the two accuracy numbers can be combined (e.g., averaged, added together, or other means for combining).

In one embodiment, the system can report the accuracy indications from steps 410 and 426 (in step 412) to a computer that will decide whether to proceed with the mosaics or not proceed. If the accuracy is good enough (predicted error is low enough), then the system can proceed with generating the mosaic. If the accuracy is not good enough (the predicted error is too high), then the system will not perform the orthorectifying and creation of mosaic.

In another embodiment, for each of those pairs that were provided with error estimates in step 408, the system will rank each pair of overlapping images in step 442 based on that generated image error estimate from step 408. The reported ranking is provided to the mosaic engine in step 444. Additionally, in step 450 (after step 426), the system ranks each image based on the residuals based on absolute accuracy. That is the residual numbers for each image can be summed up or averaged in order to create a ranking of all the images based on the summed or averaged residuals. In step 452, the ranking based on absolute accuracy is provided to the mosaic engine 124.

Figure 11:
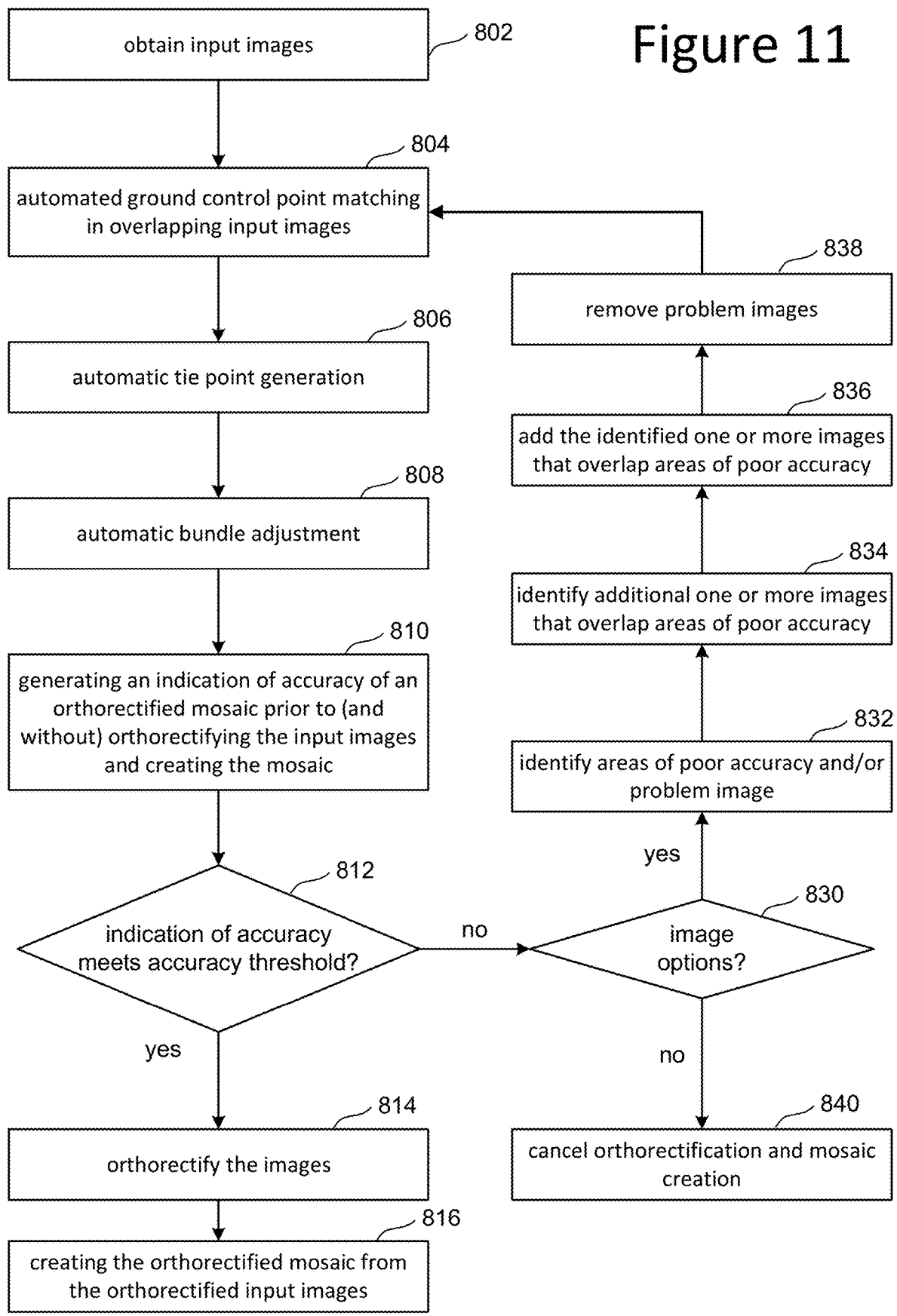
FIG. 11 is a flow chart describing one embodiment of a process for creating an orthorectified mosaic.

FIG. 11 is a flowchart describing another embodiment of a process for creating an orthorectified mosaic. In one embodiment, the process of FIG. 11 is performed by the components of FIG. 2. In step 802 of FIG. 11, the system obtains input images. Step 802 is similar to step 602 of FIG. 3. In step 804 of FIG. 11, the system performs automated ground control point matching in the set of overlapping input images. Step 804 of FIG. 11 is similar to step 204 of FIG. 3. In step 806 of FIG. 11, the system performs automatic tie point generation to identify tie points in the set of overlapping input images from the satellites (or other aircraft or structures). Step 806 of FIG. 11 is similar to step 206 in FIG. 3. In some embodiments, the process of FIG. 11 uses ground control points in addition to or instead of tie points. In step 808 of FIG. 11, the system performs automatic bundle adjustments. Step 808 is similar to step 208 of FIG. 3. In step 810, the system generates an indication of accuracy of an orthorectified mosaic prior to (and without) orthorectifying the input images and creating the mosaic. Step 810 is similar to step 210 in FIG. 3. In step 812, the system determines whether the indication of accuracy created in step 810 meets an accuracy threshold. For example, the system can compare the generated indication of relative accuracy (see step 410 of FIG. 6) to a threshold, compare the generated indication of absolute accuracy (see step 426 of FIG. 6) to a threshold, or a combined accuracy estimation (see step 412) to a threshold. The threshold can be a threshold that is guaranteed to a customer or determined based on experimentation to have a high quality mosaic. If the indication of accuracy meets the accuracy threshold, then in step 814 the system will orthorectify the adjusted input images. Step 814 is similar to step 212 of FIG. 3. In step 816, the system will create the orthorectified mosaic from the orthorectified input images. Step 816 is similar to step 214 in FIG. 3.

If, in step 812, the system determines that the indication of accuracy does not meet the accuracy threshold, then in step 830 the system determines whether there are options to change the population of overlapping input images. If so, then in step 832, the system identifies areas of poor accuracy and/or problems in the image. This can identify one or more input images that are creating a problem. In step 834, the system will identify one or more images that are not part of the current population of images, but otherwise overlap the area of poor accuracy that was identified in step 832. Those additional one or more images are added to the population of input images in step 836. In step 838, problem images that overlap the areas of poor accuracy can be removed in step 838. Note in some embodiments, step 838 is not performed. In some embodiments, step 834 and step 836 are not performed. After adding new images and removing bad images, the process loops back to step 804 and performs a new iteration of steps 804 to 812. If, in step 830, the system determines that there are no more options to change the population of input images, then the process moves to step 840 and cancels the orthorectification and mosaic creation. Thus, FIG. 11 shows a system where if the indication of accuracy that was generated prior to the orthorectifying and prior to the creating mosaic determines that the resulting mosaic would not be of sufficient quality, then the system will adjust the images used to create the orthomosaic and continue iterating until the mosaic is predicted to be of sufficient quality. All these iterations of adjusting the orthomosaic are performed without actually orthorectifying the images and creating the orthorectifying mosaic, thereby, saving computational resources and time.

Thus, the process of FIG. 11 is an example of, in response to determining that the generated indication of accuracy does not meet the accuracy threshold, the system adjusting the plurality of images, accessing the new set of points (tie points or ground control points) and the updated adjusted plurality of input images, projecting the new set of points to the model, determining new residuals of the new set of projected points, generating a new indication of accuracy based on the determined new residuals (without generating the orthorectified mosaic), and then subsequently orthorectifying the adjusted plurality of input images, including the orthorectified mosaic. This adjusting and regeneration of the indication of accuracy includes performing step 810 multiple times (one for each iteration) with a different set of points for the different sets of overlapping input images.

Figure 10:
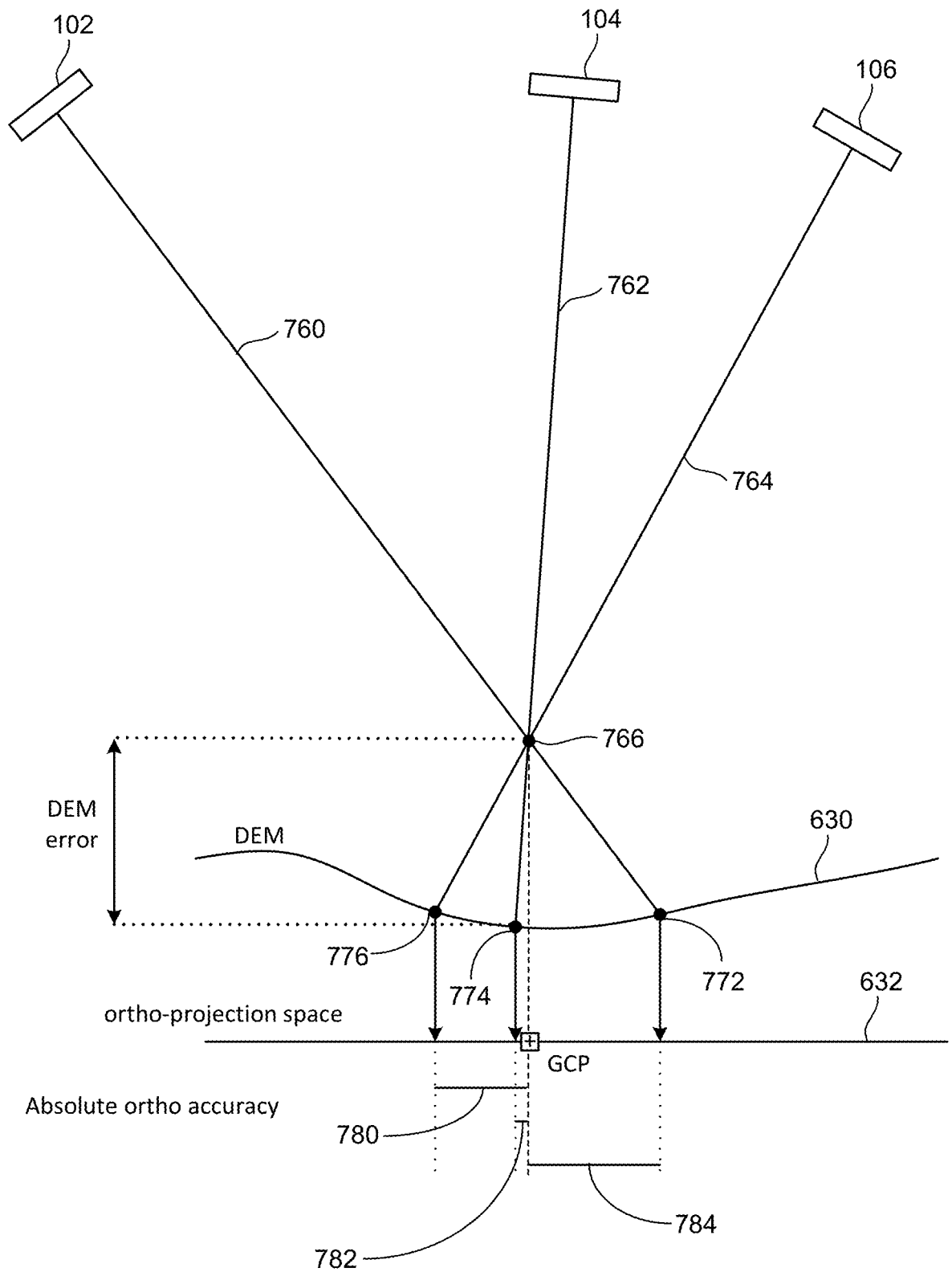
FIG. 10 illustrates one example of projecting ground control points to a digital elevation model.
Figure 12:
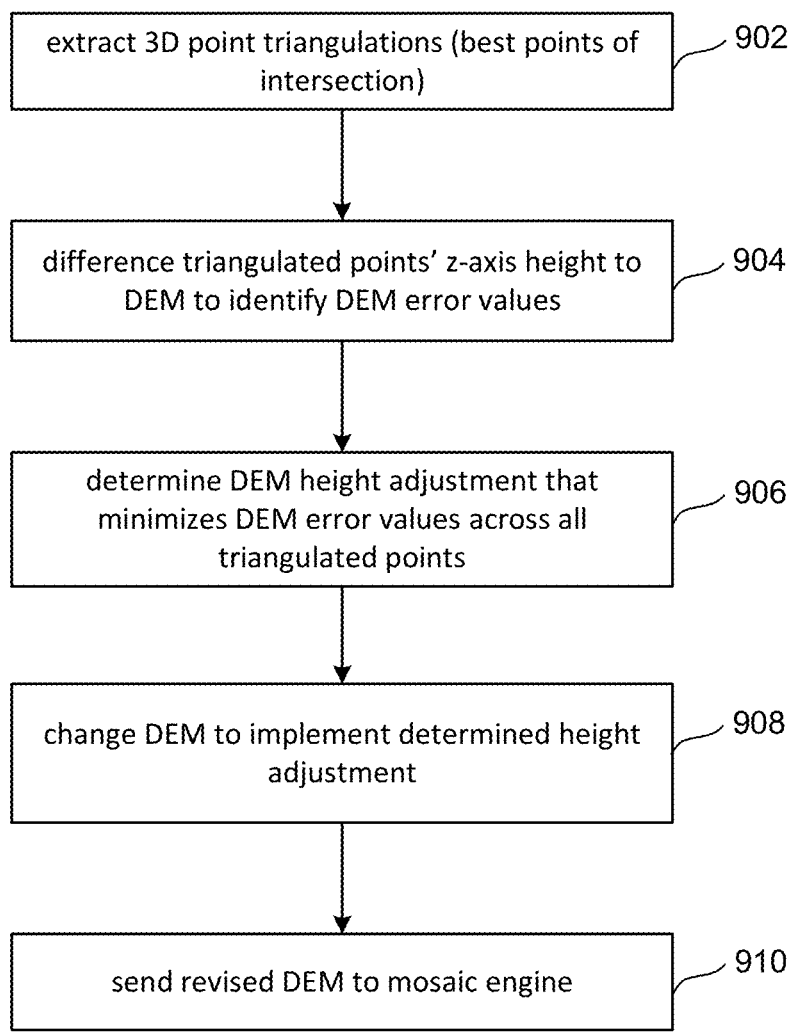
FIG. 12 is a flow chart describing one embodiment of a process for updating a digital elevation model.

As discussed above, there can be an error in the DEM. FIGS. 8 & 10 graphically depict the DEM error. FIG. 12 is a flowchart describing one embodiment of a process for updating the DEM to reduce (or remove) the error. In one embodiment, the process of FIG. 12 can be performed by pre-processing engine 120. Once the DEM is updated to reduce (or remove) the DEM error, the updated DEM can be provided to the mosaic engine 124 so that the mosaic is built using the updated DEM. Therefore, the process of FIG. 12 can be performed between steps 210 and 212 of FIG. 3 or between steps 812 and 814 of FIG. 11. In step 902 of FIG. 12, the system will extract 3D point triangulations (the best points of intersection). For example, looking back at FIGS. 5A and 5B, the system had performed triangulation to go from three intersection points 372, 374, 370 to one intersection point 380. In one embodiment, this is performed using triangulation to create a best point of intersection 380. Step 102 of FIG. 12 includes accessing the best points of intersection for all of the tie points. In step 904, the system determines the difference between those best points of intersection and the DEM based on the Z height between the best point of intersection and the DEM to identify the DEM error (see FIGS. 8 and 10). In step 906, the system determines the height adjustment to the DEM that creates a minimum of all the DEM errors for all of the tie points. That is to determine the DEM height adjustment that minimizes DEM error values across all triangulated points. In step 908, the DEM is changed to implement the determined height adjustment from step 906. In step 910, the revised DEM is sent to the mosaic engine. Note that arrow 660 of FIG. 8 shows how the DEM is adjusted in step 908. Note that steps 902-908 are performed in ortho-projection space.

A system has been described that generates an indication of accuracy of an orthorectified mosaic prior to orthorectifying and creating the mosaic. Therefore, it can be confirmed prior to the processes of orthorectifying and creating the mosaic whether the resulting mosaic will be of sufficient quality, which will save computational resources and time. For example, if it is determined that the resulting mosaic will not be of sufficient quality (e.g., due to misalignment), then the steps of orthorectifying and creating the mosaic will not be performed (which reduces use of computational resources). For example, an entity may have access to a data center for which the entity is charged based on time or usage of computational resources. Therefore, using the indication of accuracy of an orthorectified mosaic to avoid the steps of orthorectifying and creating the mosaic saves money to the entity that would have been charged for usage of computational resources to build a bad mosaic. Additionally, by using the indication of accuracy of an orthorectified mosaic to avoid the steps of orthorectifying and creating the mosaic for a bad mosaic, the entity can adjust the input images to obtain the final high quality mosaic faster since time was not wasted orthorectifying and creating bad mosaics. Furthermore, the computational resources saved by not orthorectifying and creating bad mosaics can be used for other more productive uses.

Based on predicted accuracy, the images comprising the most accurate possible mosaic can be selected before orthorectification. Mosaics can be optimized for absolute or relative (shear) accuracy, or some weighted blend. Based on the predicted accuracy, a quality control step can evaluate if the currently selected material will meet a required accuracy specification before spending time and money to orthorectify the imagery and build the mosaic. Additional material overlapping problem areas may be ordered and substituted, or operators can simply be informed that the final product may not meet specification, or the project can be aborted.

Based on predicted accuracy, the system can identify problematic regions of the digital elevation model (DEM). Areas where the projected accuracy relative error for all of the images correlates to off-nadir angle (ONA) will indicate that the ray intersection is not in agreement with the DEM contact point of all the rays. When this occurs on a single point, that indicates a likely poor point, but when it occurs on a majority points in a geographic section, that indicates a likely DEM error.

Problematic regions of the DEM can be identified and adjusted prior to the orthorectification by applying an optimized smoothed surface fit to the ray intersection offsets for the questionable region to the DEM, and revised accuracy can be predicted based on the corrected DEM.

Applying robust mean analysis on tie-points between images can provide an independent means of deblundering tie-points, allowing removal of points that provide questionable matching precision. This can occur due to parallax issues where points may be on raised structures, or where DEM errors occur. The bundle can then be rerun with poor points omitted, and a high-quality bundle solution may be achieved prior to sending images to an orthorectification process. The same analysis can be applied to tie-points or GCPs saved in a library, and poor-quality library points can be identified for refinement or elimination.

The system is fully automated and does not require any manual measurements by people.

The process is applied to satellite imagery but could also be applied to aerial imagery from other manned or unmanned air-based or land-based vehicles or structures.

The process is applied to electro-optical (EO) visual-band imagery but can also be applied to other electromagnetic bands such as SWIR, IR, SAR, multispectral, or hyperspectral.

Images may originate from push-broom or frame type cameras for EO.

In addition to the original orthomosaic application, the system may be applied to accuracy prediction on any co-registered ortho-imagery with common tie-points or GCPs, such as multi-spectral data-cubes or time-series image stacks.

One embodiment includes a method comprising accessing a set of points in images of a plurality of input images; projecting the points to a model; determining residuals for the projected points; and generating an indication of accuracy of an orthorectified mosaic for the plurality of input images based on the determined residuals, the generating the indication of accuracy of the orthorectified mosaic is performed without generating the orthorectified mosaic from the plurality of input images.

One example implementation further includes orthorectifying the input images and creating the orthorectified mosaic from the orthorectified input images, the generating the indication of accuracy of the orthorectified mosaic for the plurality of input images is performed prior to orthorectifying the input images and prior to creating the orthorectified mosaic from the orthorectified input images.

One example implementation further includes determining whether the generated indication of accuracy meets an accuracy threshold.

One example implementation further includes determining that the generated indication of accuracy meets an accuracy threshold and, in response to determining that the generated indication of accuracy meets the accuracy threshold, orthorectifying the input images and creating the orthorectified mosaic from the orthorectified input images, the generating the indication of accuracy of the orthorectified mosaic for the plurality of input images is performed prior to orthorectifying the input images and prior to creating the orthorectified mosaic from the orthorectified input images.

One example implementation further includes determining that the generated indication of accuracy does not meet an accuracy threshold; and in response to determining that the generated indication of accuracy does not meet the accuracy threshold, adjusting the plurality of input images in order to improve the indication of accuracy.

One example implementation further includes determining that the generated indication of accuracy does not meet an accuracy threshold and, in response to determining that the generated indication of accuracy does not meet the accuracy threshold, performing: adjusting the plurality of input images, accessing a new set of points in the adjusted plurality of input images, projecting the new set of points to the model, determining new residuals for the new set of projected points, generating a new indication of accuracy of an orthorectified mosaic for the adjusted plurality of input images based on the determined new residuals, the generating the indication of accuracy of the orthorectified mosaic is performed without generating the orthorectified mosaic from the adjusted plurality of input images, orthorectifying the adjusted plurality of input images, and creating the orthorectified mosaic from the orthorectified adjusted plurality of input images, the generating the new indication of accuracy of the orthorectified mosaic for the adjusted plurality of input images is performed prior to orthorectifying the adjusted plurality of input images and prior to creating the orthorectified mosaic from the orthorectified adjusted plurality of input images. In one example, the adjusting the plurality of input images comprises: identifying areas in the input images that have poor accuracy; identifying new images that overlap the areas in the input images that have poor accuracy; and adding the new images to the plurality of input images to create the adjusted plurality of input images. In one example, the adjusting the plurality of input images comprises: identifying areas in the input images that have poor accuracy; and removing one or more images from the plurality of input images that overlap the areas in the input images that have poor accuracy to create the adjusted plurality of input images.

In one example implementation, the input images include overlapping input images that are from a plurality of sensors at different perspectives, each of the input images include metadata; and the method further comprises automatically matching ground control points in at least a subset of the input images, automatically generating tie points in the input images, and automatically adjusting at least a subset of the metadata for the input images.

One example implementation further includes determining that the generated indication of accuracy meets an accuracy threshold; and in response to determining that the generated indication of accuracy meets the accuracy threshold, orthorectifying the input images and creating the orthorectified mosaic from the orthorectified input images, the generating the indication of accuracy of the orthorectified mosaic for the plurality of input images is performed prior to orthorectifying the input images and prior to creating the orthorectified mosaic from the orthorectified input images.

In one example implementation: each input image includes metadata, the metadata includes attitude and location data for a source of the image; the projecting the points to the model comprises, for each point of at least a subset of the points: accessing overlapping images that include the respective point, projecting rays from the sources of the input images to the model in ortho-projection space, and determining latitude and longitude of intersection points in ortho-projection space where the rays intersect the model.

In one example implementation: a first subset of the points are tie points in overlapping images of the input images; the determining residuals for the projected points comprises determining relative distances along a plane in ortho-projection space between intersection points for common tie point; a second subset of the points are ground control points that have been accurately surveyed on the actual surface represented by the model to define actual surveyed ground control points; and the determining residuals for the projected points comprises determining distances along a plane in ortho-projection space between intersection points and actual surveyed ground control points.

In one example implementation, the generating the indication of accuracy comprises aggregating the residuals using an error function.

One example implementation further includes projecting the points to the model includes performing triangulation to determine a best points of intersection in ortho-projection space for rays projected for the points from overlapping images, the model is in ortho-projection space; and updating the model for subsequent use to generate the orthorectified mosaic from the plurality of input images, the updating the model comprises: accessing the best points of intersection, determining distances to the model in ortho-projection space for the best points of intersection, determining a height adjustment for the model in ortho-projection space that minimizes the determined distances across all of the best points of intersection, and changing the model by implementing the height adjustment to the model.

One example implementation further includes receiving the plurality of input images from different satellites at different locations, each input image includes metadata, the metadata includes attitude and ephemeris data for the respective satellite and image; and altering the metadata to reduce error prior to the projecting, the projecting uses the metadata.

One embodiment includes one or more non-transitory processor readable storage mediums that collectively store processor readable code that, when executed by one or more processors, cause the one or more processors to perform a method. The method comprises accessing a set of points in overlapping images of a plurality of input images; projecting the points to a digital elevation model in ortho-projection space; determining differences for the projected points in ortho-projection space; and generating an indication of accuracy of an orthorectified mosaic for the plurality of input images based on the determined differences for the projected points in ortho-projection space, the generating the indication of accuracy of an orthorectified mosaic is performed without generating the orthorectified mosaic from the plurality of input images. Examples of non-transitory processor readable storage mediums include RAM (e.g., DRAM, SRAM), ROM, flash memory, MRAM, other solid state memories, disk drives, etc.). In one example, the method further comprises: determining whether the indication of accuracy satisfies a threshold; and generating the orthorectified mosaic from the plurality of input images if the indication of accuracy satisfies the threshold, the generating the indication of accuracy is performed prior to the generating the orthorectified mosaic from the plurality of input images.

One embodiment includes an apparatus comprising one or more processors and one or more processor readable storage devices in communication with the one or more processors. The one or more processor readable storage devices store code for programming the one or more processors to access a set of tie points in overlapping images of a plurality of input images, for each tie point of the set of tie points project the tie point from overlapping images to a digital elevation model, for each tie point of the set of tie points, determine a difference in the projections to the digital elevation model from overlapping images, and generate an indication of accuracy of an orthorectified mosaic for the plurality of input images based on aggregation of the determined differences in the projections for the set of tie points. In one example implementation, the one or more processor readable storage devices store code for programming the one or more processors to determine whether the indication of accuracy satisfies a threshold and generate the orthorectified mosaic from the plurality of input images, the generating the indication of accuracy is performed prior to the generating the orthorectified mosaic from the plurality of input images.

One embodiment includes a method comprising accessing a set of points in overlapping images of a plurality of input images; projecting the points to a model; determining residuals for the projected points; and ranking images of the plurality of input images based on the residuals. One example implementation further comprises generating an orthorectified mosaic from the plurality of input images based on the ranking of the images. In one example implementation, the ranking images of the plurality of input images based on the residuals comprises generating error estimates for pairs of overlapping images based on the residuals and ranking pairs of overlapping images based the generated error estimates, the generating the orthorectified mosaic uses the ranking of pairs of overlapping images. In one example implementation, at least a subset of the points are ground control points and the ranking images of the plurality of input images based on the residuals comprises ranking at least a subset of the input images based on residuals for the ground control points, the generating the orthorectified mosaic uses the ranking of input images based on residuals for the ground control points.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. A method, comprising:
accessing a set of points in images of a plurality of input images;
projecting the points to a model;
determining residuals for the projected points;
generating an indication of accuracy of an orthorectified mosaic for the plurality of input images based on the determined residuals, the generating the indication of accuracy of the orthorectified mosaic is performed without generating the orthorectified mosaic from the plurality of input images;
determining that the generated indication of accuracy does not meet an accuracy threshold; and
in response to determining that the generated indication of accuracy does not meet the accuracy threshold:
adjusting the plurality of input images to add a new image to the plurality of input images or remove an image from the plurality of input images,
generating a new indication of accuracy of an orthorectified mosaic for the adjusted plurality of input images,
determining that the new indication of accuracy meets the accuracy threshold, and
orthorectifying the adjusted plurality of input images and creating the orthorectified mosaic from the orthorectified adjusted plurality of input images.

2. A method, comprising:
accessing a set of points in images of a plurality of input images;
projecting the points to a model;
determining residuals for the projected points;
generating an indication of accuracy of an orthorectified mosaic for the plurality of input images based on the determined residuals, the generating the indication of accuracy of the orthorectified mosaic is performed without generating the orthorectified mosaic from the plurality of input images;
determining that the generated indication of accuracy does not meet an accuracy threshold; and
in response to determining that the generated indication of accuracy does not meet the accuracy threshold:
adjusting the plurality of input images,
accessing a new set of points in the adjusted plurality of input images,
projecting the new set of points to the model,
determining new residuals for the new set of projected points,
generating a new indication of accuracy of an orthorectified mosaic for the adjusted plurality of input images based on the determined new residuals, the generating the indication of accuracy of the orthorectified mosaic is performed without generating the orthorectified mosaic from the adjusted plurality of input images,
orthorectifying the adjusted plurality of input images, and
creating the orthorectified mosaic from the orthorectified adjusted plurality of input images, the generating the new indication of accuracy of the orthorectified mosaic for the adjusted plurality of input images is performed prior to orthorectifying the adjusted plurality of input images and prior to creating the orthorectified mosaic from the orthorectified adjusted plurality of input images.

3. The method of claim 2, wherein the adjusting the plurality of input images comprises:
identifying areas in the input images that have poor accuracy;
identifying new images that overlap the areas in the input images that have poor accuracy; and
adding the new images to the plurality of input images to create the adjusted plurality of input images.

4. The method of claim 2, wherein the adjusting the plurality of input images comprises:

identifying areas in the input images that have poor accuracy; and removing one or more images from the plurality of input images that overlap the areas in the input images that have poor accuracy to create the adjusted plurality of input images.

5. The method of claim 1, wherein:

the input images include overlapping input images that are from a plurality of sensors at different perspectives, each of the input images include metadata; and the method further comprises automatically matching ground control points in at least a subset of the input images, automatically generating tie points in the input images, and automatically adjusting at least a subset of the metadata for the input images.

6. The method of claim 1, wherein:

each input image includes metadata, the metadata includes attitude and location data for a source of the image;

the projecting the points to the model comprises, for each point of at least a subset of the points:
  accessing overlapping images that include the respective point,
  projecting rays from the sources of the input images to the model in ortho-projection space, and
  determining latitude and longitude of intersection points in ortho-projection space where the rays intersect the model.

7. The method of claim 6, wherein:

a first subset of the points are tie points in overlapping images of the input images; and the determining residuals for the projected points comprises determining relative distances along a plane in ortho-projection space between intersection points for common tie point.

8. The method of claim 7, wherein:

a second subset of the points are ground control points that have been accurately surveyed on the actual surface represented by the model to define actual surveyed ground control points; and the determining residuals for the projected points comprises determining distances along a plane in ortho-projection space between intersection points and actual surveyed ground control points.

9. The method of claim 1, wherein:

the generating the indication of accuracy comprises aggregating the residuals using an error function.

10. The method of claim 1, further comprising:

projecting the points to the model includes performing triangulation to determine a best points of intersection in ortho-projection space for rays projected for the points from overlapping images, the model is in ortho-projection space; and updating the model for subsequent use to generate the orthorectified mosaic from the plurality of input images, the updating the model comprises:
  accessing the best points of intersection,
  determining distances to the model in ortho-projection space for the best points of intersection,
  determining a height adjustment for the model in ortho-projection space that minimizes the determined distances across all of the best points of intersection, and
  changing the model by implementing the height adjustment to the model.

11. The method of claim 1, further comprising:

receiving the plurality of input images from different satellites at different locations, each input image includes metadata, the metadata includes attitude and ephemeris data for the respective satellite and image; and altering the metadata to reduce error prior to the projecting, the projecting uses the metadata.

12. One or more non-transitory processor readable storage mediums that collectively store processor readable code that, when executed by one or more processors, cause the one or more processors to perform a method comprising:

accessing a set of points in overlapping images of a plurality of input images, each input image includes metadata, the metadata includes attitude and location data for a source of the image;

projecting the points to a digital elevation model in ortho-projection space, the projecting the points to the model comprises, for each point of at least a subset of the points:
  accessing overlapping images that include the respective point,
  projecting rays from the sources of the input images to the model in ortho-projection space, and
  determining latitude and longitude of intersection points in ortho-projection space where the rays intersect the model;

determining residuals for the projected points in ortho-projection space, a first subset of the points are tie points in overlapping images of the input images, the determining residuals for the projected points comprises determining relative distances along a plane in ortho-projection space between intersection points for a common tie point, a second subset of the points are ground control points that have been accurately surveyed on the actual surface represented by the model to define actual surveyed ground control points, the determining residuals for the projected points comprises determining distances along a plane in ortho-projection space between intersection points and actual surveyed ground control points; and generating an indication of accuracy of an orthorectified mosaic for the plurality of input images based on the determined differences for the projected points in ortho-projection space, the generating the indication of accuracy of an orthorectified mosaic is performed without generating the orthorectified mosaic from the plurality of input images.

13. The one or more non-transitory processor readable storage mediums of claim 12, wherein the method further comprises:

determining whether the indication of accuracy satisfies a threshold; and generating the orthorectified mosaic from the plurality of input images if the indication of accuracy satisfies the threshold, the generating the indication of accuracy is performed prior to the generating the orthorectified mosaic from the plurality of input images.

14. An apparatus, comprising:

one or more processors; and one or more processor readable storage devices in communication with the one or more processors, the one or more processor readable storage devices store code for programming the one or more processors to:
  access a set of tie points in overlapping images of a plurality of input images, for each tie point of the set of tie points, project the tie point from overlapping images to a digital elevation model, for each tie point of the set of tie points, determine a difference in the projections to the digital elevation model from overlapping images, generate an indication of accuracy of an orthorectified mosaic for the plurality of input images based an aggregation of the determined differences in the projections for the set of tie points, determine that the generated indication of accuracy does not meet an accuracy threshold, and in response to determining that the generated indication of accuracy does not meet the accuracy threshold:

adjust the plurality of input images, access a new set of tie points in the adjusted plurality of input images, project the new set of points to the digital elevation model, determine new differences in the projections to the digital elevation model from overlapping images for the new set of projected points, generate a new indication of accuracy of an orthorectified mosaic for the adjusted plurality of input images based on the determined new differences, the generating the indication of accuracy of the orthorectified mosaic is performed without generating the orthorectified mosaic from the adjusted plurality of input images based on the determined new differences, orthorectify the adjusted plurality of input images, and create the orthorectified mosaic from the orthorectified adjusted plurality of input images.

15. A method, comprising:

accessing a set of points in images of a plurality of input images;

projecting the points to a model;

determining residuals for the projected points, a first subset of the points are tie points in the overlapping images and the determining residuals for the projected points includes determining relative distances along a plane in ortho-projection space between intersection points on the model for the tie points, a second subset of the points are ground control points that have been accurately surveyed on the actual surface represented by the model to define actual surveyed ground control points and the determining residuals for the projected points further includes determining distances along a plane in ortho-projection space between intersection points on the model for the ground control points and actual surveyed ground control points; and generating an indication of accuracy of an orthorectified mosaic for the plurality of input images based on the determined residuals, the generating the indication of accuracy of the orthorectified mosaic is performed without generating the orthorectified mosaic from the plurality of input images.

* * * * *